United States Patent
Hintermeister et al.

(10) Patent No.: US 10,386,986 B1
(45) Date of Patent: Aug. 20, 2019

(54) PROVIDING AN INTERACTIVE PRESENTATION ENVIRONMENT

(71) Applicant: Google LLC, Mountain View, CA (US)

(72) Inventors: Gregory Richard Hintermeister, Rochester, MN (US); Michael D. Rahn, Rochester, MN (US)

(73) Assignee: Google LLC, Mountain View, CA (US)

( * ) Notice: Subject to any disclaimer, the term of this patent is extended or adjusted under 35 U.S.C. 154(b) by 100 days.

(21) Appl. No.: 15/604,522

(22) Filed: May 24, 2017

Related U.S. Application Data

(63) Continuation of application No. 14/696,280, filed on Apr. 24, 2015, now Pat. No. 9,665,237, which is a continuation of application No. 14/294,077, filed on Jun. 2, 2014, now Pat. No. 9,037,973, which is a continuation of application No. 12/128,105, filed on May 28, 2008, now Pat. No. 8,745,497, which is a continuation of application No. 11/035,562, filed on Jan. 14, 2005, now Pat. No. 7,395,508.

(51) Int. Cl.
  *G06F 3/0481* (2013.01)
  *H04L 29/06* (2006.01)
  *G06F 16/44* (2019.01)

(52) U.S. Cl.
  CPC .......... *G06F 3/0481* (2013.01); *G06F 16/447* (2019.01); *H04L 65/403* (2013.01)

(58) Field of Classification Search
  CPC ............. G06F 3/0481; G06F 17/30064; G06F 16/447; H04L 65/403
  See application file for complete search history.

(56) References Cited

U.S. PATENT DOCUMENTS

| | | | |
|---|---|---|---|
| 5,550,965 | A | 8/1996 | Gabbe et al. |
| 5,692,213 | A | 11/1997 | Goldberg et al. |
| 6,144,991 | A | 11/2000 | England |
| 6,343,313 | B1 | 1/2002 | Salesky et al. |
| 6,553,108 | B1 | 4/2003 | Felger |
| 6,789,228 | B1* | 9/2004 | Merril .............. G02B 26/0816 707/E17.009 |
| 6,874,119 | B2 | 3/2005 | Macleod Beck et al. |
| 7,212,873 | B1 | 5/2007 | Townsend et al. |
| 7,213,051 | B2 | 5/2007 | Zhu et al. |

(Continued)

OTHER PUBLICATIONS http://fwvvw.tivo.com/1.0.asp, "What is TiVo?", printed Sep. 30, 2004.
http://fwvvw.tivo.com/1.2.asp, "TiVo Service", printed Sep. 30, 2004.

*Primary Examiner* — Tadesse Hailu
(74) *Attorney, Agent, or Firm* — IP Spring

(57) ABSTRACT

An interactive presentation environment for eMeetings or the like that provides participants with more control over what they see and hear. The interactive presentation environment may comprise a meeting recorder adapted to create a recording of a live meeting and a navigation control for selecting a portion of the recording to view during the live meeting. The interactive presentation environment may further comprise a timeline control containing a first graphical indicator associated with a live position and a second graphical indicator associated with a current position, a bookmark control adapted to mark a portion of the recording for archiving, and a display operatively connected to the meeting recorder and the navigation control.

19 Claims, 10 Drawing Sheets

(56) References Cited

U.S. PATENT DOCUMENTS

| | | |
|---|---|---|
| 7,298,930 B1 | 11/2007 | Erol et al. |
| 7,395,508 B2 | 7/2008 | Hintermeister et al. |
| 7,554,576 B2 | 6/2009 | Erol et al. |
| 8,209,181 B2 | 6/2012 | Heckerman et al. |
| 8,533,268 B1 | 9/2013 | Vernon et al. |
| 8,745,497 B2 | 6/2014 | Hintermeister et al. |
| 9,037,973 B1 | 5/2015 | Hintermeister et al. |
| 2002/0042813 A1 | 4/2002 | Ullman et al. |
| 2002/0091658 A1 | 7/2002 | Bae |
| 2002/0112004 A1 | 8/2002 | Reid et al. |
| 2002/0188576 A1 | 12/2002 | Peterson et al. |
| 2002/0188943 A1 | 12/2002 | Freeman et al. |
| 2004/0143603 A1* | 7/2004 | Kaufmann ............ G09B 5/08 |
| 2004/0143630 A1* | 7/2004 | Kaufmann ........ G06F 17/30017 709/205 |
| 2004/0153504 A1* | 8/2004 | Hutchinson ....... G06F 17/30017 709/204 |
| 2004/0169683 A1* | 9/2004 | Chiu ................. G06F 17/30017 715/776 |
| 2004/0184586 A1 | 9/2004 | Coles et al. |
| 2004/0203621 A1* | 10/2004 | Brown .............. H04M 3/42221 455/412.1 |
| 2004/0207724 A1 | 10/2004 | Crouch et al. |
| 2004/0252185 A1 | 12/2004 | Vernon et al. |
| 2004/0257939 A1 | 12/2004 | Kawamura |
| 2004/0263636 A1* | 12/2004 | Cutler ...................... H04N 7/15 348/211.12 |
| 2005/0004982 A1 | 1/2005 | Vernon et al. |
| 2006/0053194 A1 | 3/2006 | Schneider et al. |
| 2006/0089820 A1 | 4/2006 | Yu et al. |
| 2006/0140098 A1 | 6/2006 | Champion et al. |
| 2007/0033528 A1 | 2/2007 | Merril et al. |
| 2007/0188901 A1 | 8/2007 | Heckerman et al. |
| 2007/0260690 A1* | 11/2007 | Coleman .............. G10H 1/0058 709/205 |

\* cited by examiner

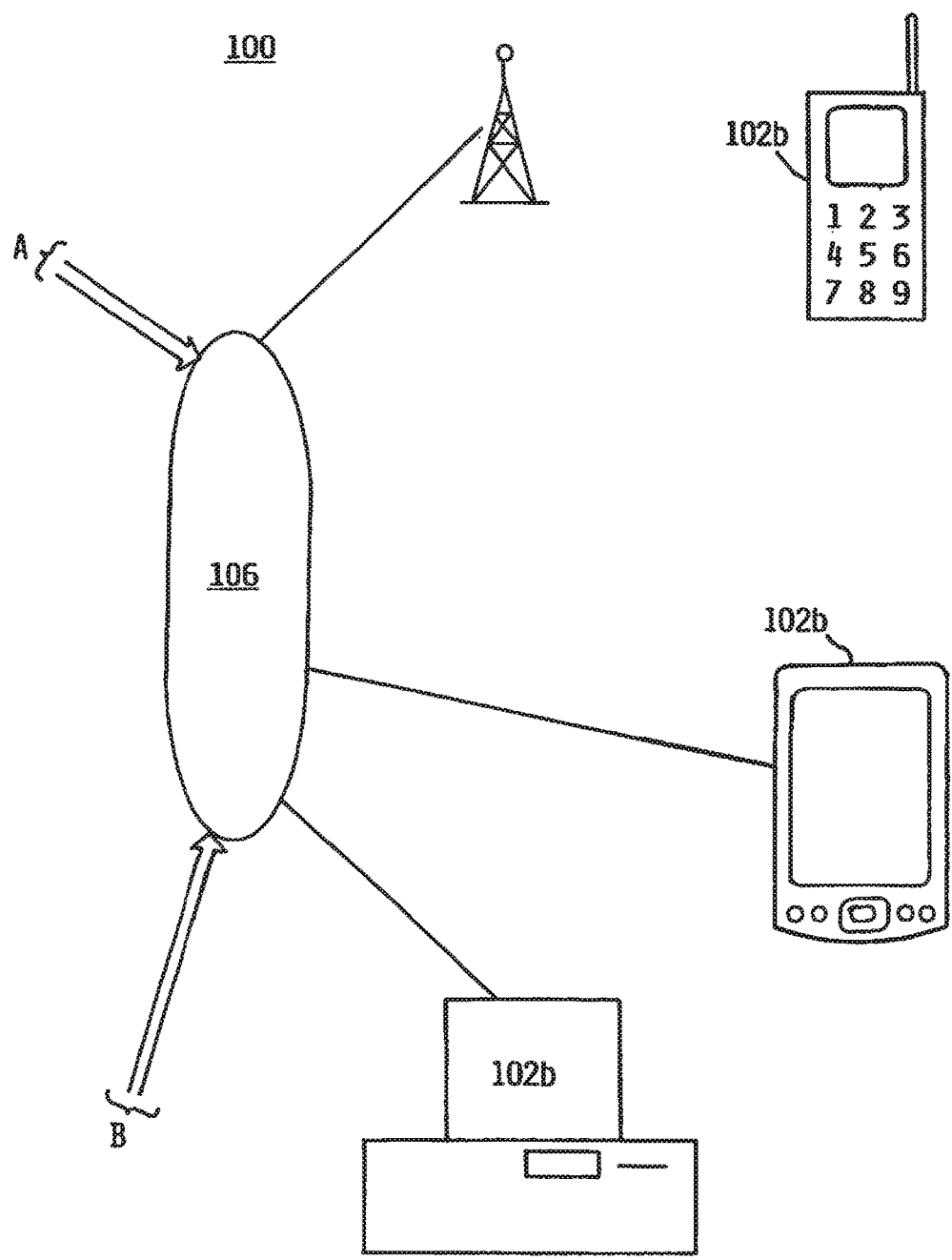
FIG. IC

US 10,386,986 B1

PROVIDING AN INTERACTIVE PRESENTATION ENVIRONMENT

CROSS REFERENCE TO RELATED APPLICATIONS

The present application claims the benefit of priority under 35 U.S.C. § 120 as a continuation of U.S. patent application Ser. No. 14/696,280, titled "Providing an Interactive Presentation Environment," filed Apr. 24, 2015, which is a continuation of U.S. patent application Ser. No. 14/294,077, titled "Providing an Interactive Presentation Environment," filed on Jun. 2, 2014, now U.S. Pat. No. 9,037,973, which is a continuation of U.S. patent application Ser. No. 12/128,105, titled, "Providing an Interactive Presentation Environment," filed May 28, 2008, now U.S. Pat. No. 8,745,497, which is a continuation of U.S. patent application Ser. No. 11/035,562, titled "Method and Apparatus for Providing an Interactive Presentation Environment." filed Jan. 14, 2005, now U.S. Pat. No. 7,395,508, each of which is herein incorporated by reference in its entirety for all purposes.

FIELD

The present invention generally relates to an interactive presentation environment. More particularly, the present invention relates to methods and systems for providing real time rewinding, book marking, and archiving features to electronic meetings.

BACKGROUND

Virtually any significant undertaking today requires a team of people, both in the planning stage and in the execution stage. Organizing and coordinating these teams frequently requires that the team members meet frequently in order to plan and to coordinate their activities. In these meetings, one of the attendees typically makes a presentation. These presentations often include some audiovisual aspects, such as "charts" generated in the Microsoft PowerPoint or Lotus Freelance Graphics computer programs, or a live demo.

Historically, holding a meeting has required that each of the team members, or at least a few of their representatives, assemble at a single location, such as a conference room. Although this process worked reasonably well for organizations located at a single location, modern "matrix" organizations commonly ask people located in different states or even different countries to work together. Although these matrix organizations can provide significant efficiencies, the basic need to meet to organize, plan, and coordinate actions is unchanged.

The traditional solution to this problem is to bring all of the team members together at a single location, often yearly or semiannually. However, this solution has obvious drawbacks. For example, the time and cost necessary to get each team member to a single location can be considerable, and many problems occur between meetings. To address these problems, many organizations are replacing the traditional face-to-face meeting with electronic meetings or "eMeetings."

Although eMeetings have improved productivity in the workplace, one problem is that if a participant is looking at a presentation or a demo, the participant can only view the current chart. That is, if a participant wants to clarify something from a previous chart, the participant has to obtain a separate copy of the charts in order to get that clarification. In many cases, this is impossible because the eMeetings include a live demo or because the charts are updated throughout the meeting.

Without a way to give the participants more control over what they are seeing, the promise of eMeetings may never be fully achieved.

SUMMARY

The present invention provides an interactive presentation environment for an eMeeting or the like that provides participants with more control over what they see and hear. One embodiment of this presentation environment comprises a meeting recorder adapted to create a recording of a live meeting and a navigation control for selecting a portion of the recording to view during the live meeting. Some embodiment may further comprise a timeline control containing a first graphical indicator associated with a live position and a second graphical indicator associated with a current position, a bookmark control adapted to mark a portion of the recording for archiving, and a display operatively connected to the meeting recorder and the navigation control.

BRIEF DESCRIPTION OF THE DRAWINGS

FIGS. 1A-1C (hereafter "FIG. 1") depict one embodiment of an interactive presentation environment.

DETAILED DESCRIPTION

Figure 1A:
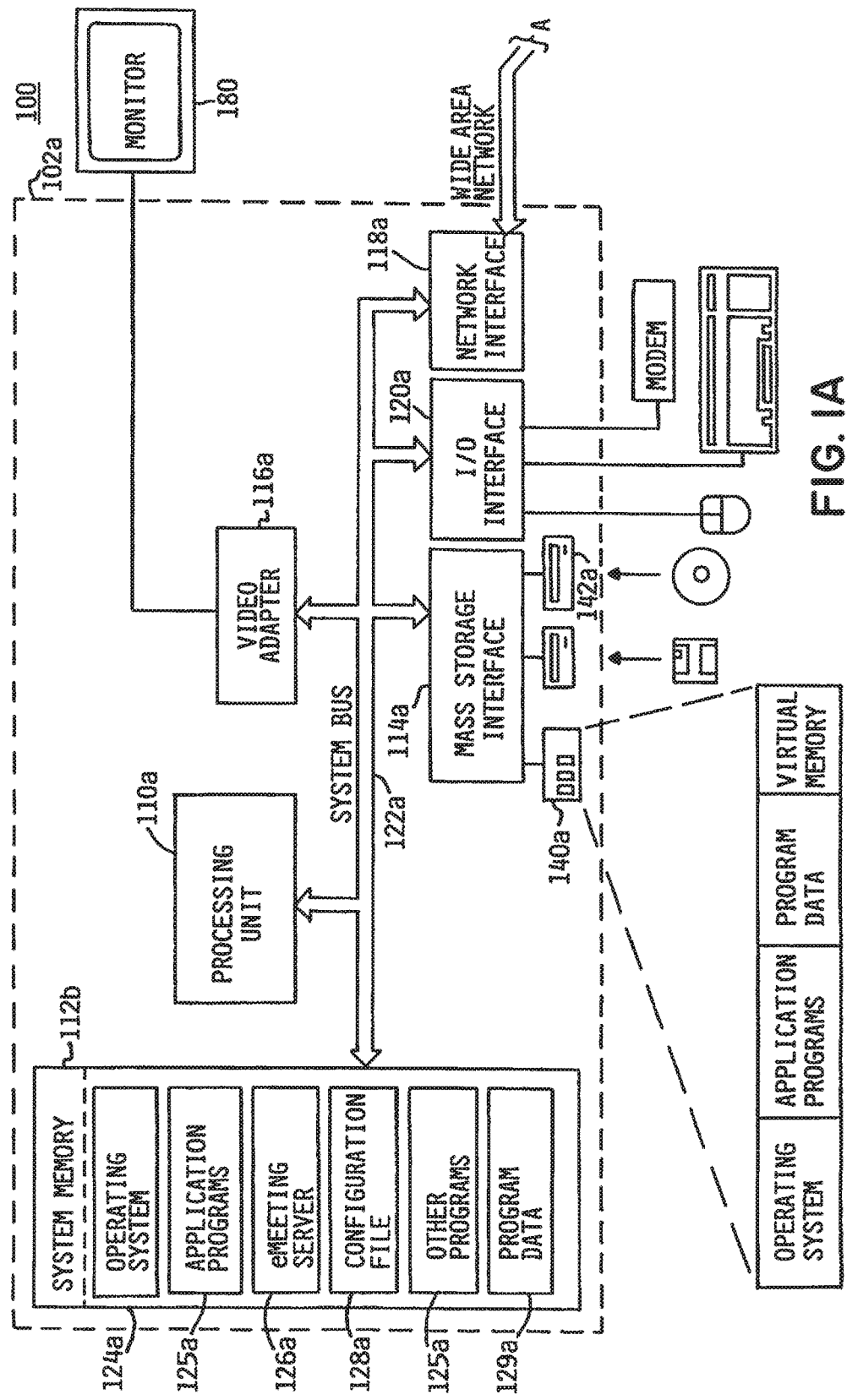
Figure 1B:
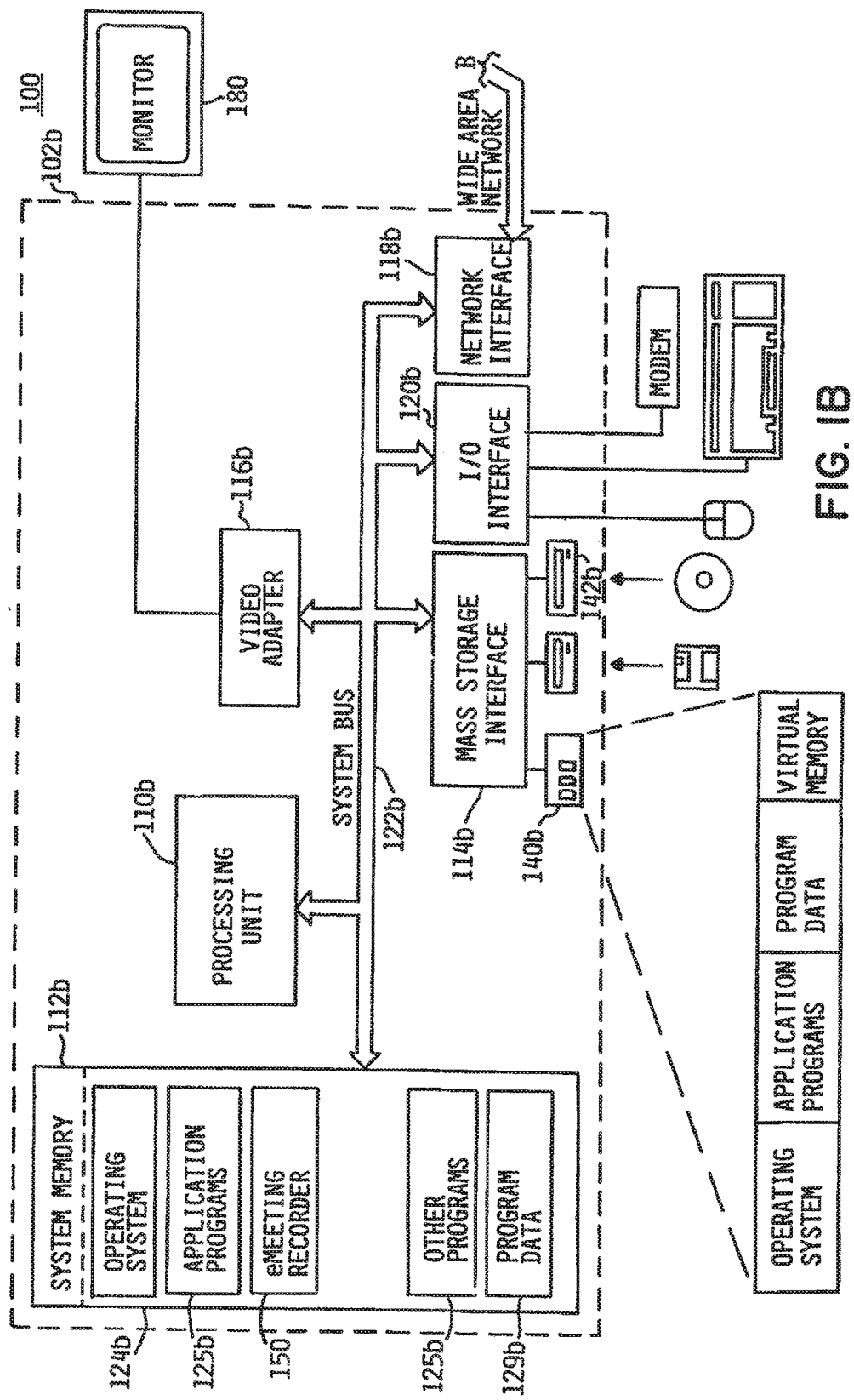

FIG. 1 depicts one embodiment of an interactive presentation environment 100 comprising an eMeeting server computer 102a and a plurality of eMeeting client computers 102b (only one client computer 102b shown in detail for clarity) interconnected by a communications medium 106. Each computer system 102 has one or more central processing units 110 ("CPU") connected to a main memory unit 112, a mass storage interface 114, a display interface 116, a network interface 118, and an input/output ("I/O") interface 120 by a system bus 122. The mass storage interfaces 114 connect the system busses 122 to one or more mass storage devices, such as a direct access storage device 140 and a readable and a writable optical disk drive 142. The network interfaces 118 allow the computer systems 102 to communicate with each other and to a plurality of other computers (not shown) over the communications medium 106. The main memory 112a in the eMeeting server 102a contains an operating system 124a, one or more application programs 125a, an eMeeting application server program 126 capable of maintaining and managing a plurality of connections into an eMeeting, a configuration file 128, and program data 129a. The main memory 112b in the client computers 102b contains an operating system 124b, one or more application programs 125b, program data 129b, and an eMeeting recorder 150 capable of communicating with the eMeeting application server program 126.

Figure 2:
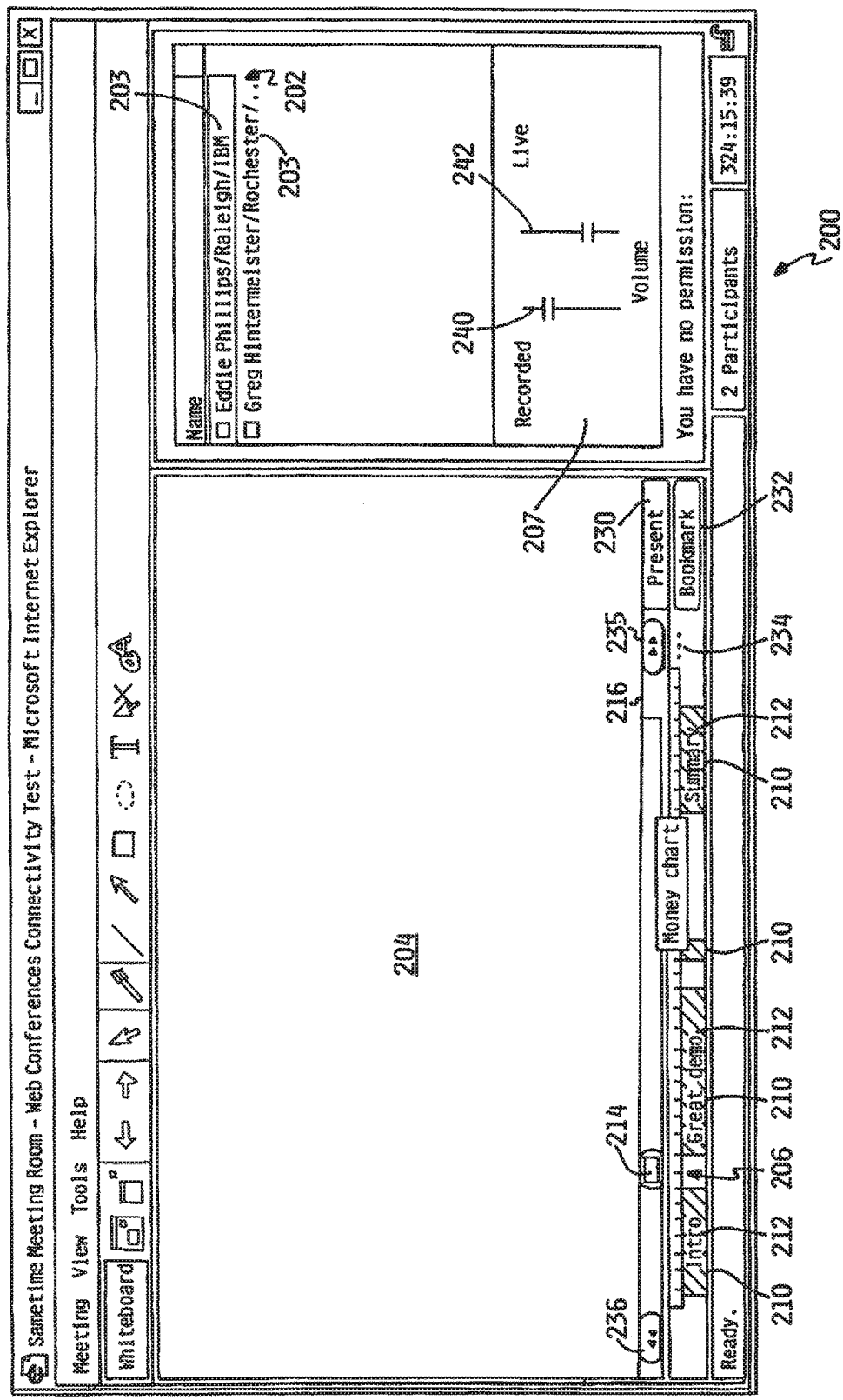
FIG. 2 illustrates a graphical user interface for one embodiment of an interactive presentation environment.

FIG. 2 depicts a graphical user interface ("GUI") 200 for the eMeeting recorder 150. The client GUI 200 comprises a participant list 202 that displays a plurality of meeting attendees 203, a presentation display area 204, a timeline 206, and a volume control panel 207. The timeline 206 comprises a plurality of bookmarks 210 with associated labels 212, a current position slider 214, and a live meeting progress indicator 216. The volume control panel 207 contains one volume control for the recorded audio 240 and a second audio control 242 for the live audio. The GUI 200 may also include a "snap-to-present" button 230, a create bookmark button 232, a meeting end icon 234 that graphically indicates that whether this is an open ended meeting (e.g., by small ellipses at the end of the timeline 206) or whether the meeting has a firm end time, a fast forward button 235, and a rewind button 236.

In operation, the eMeeting recorder 150 allows participants to record live presentation in real time so that the participant can rewind and review portions of the meeting. When attendees connect to an eMeeting, their eMeeting recorders 150 start recording the live audio and visuals as the attendee watches/listens. If the attendee wants to review a portion of the presentation or pause the presentation, the eMeeting recorder 150 continues to record the live feed so that the recorder 150 captures the entire presentation. The attendee can review the desired portion(s), then either continue watching the presentation at normal speed, navigate backwards, jump to the current live position, or watch the presentation in catch-up mode. In this way, each participant can watch every portion of the presentation regardless of whether they had to review portions.

Figure 3A:
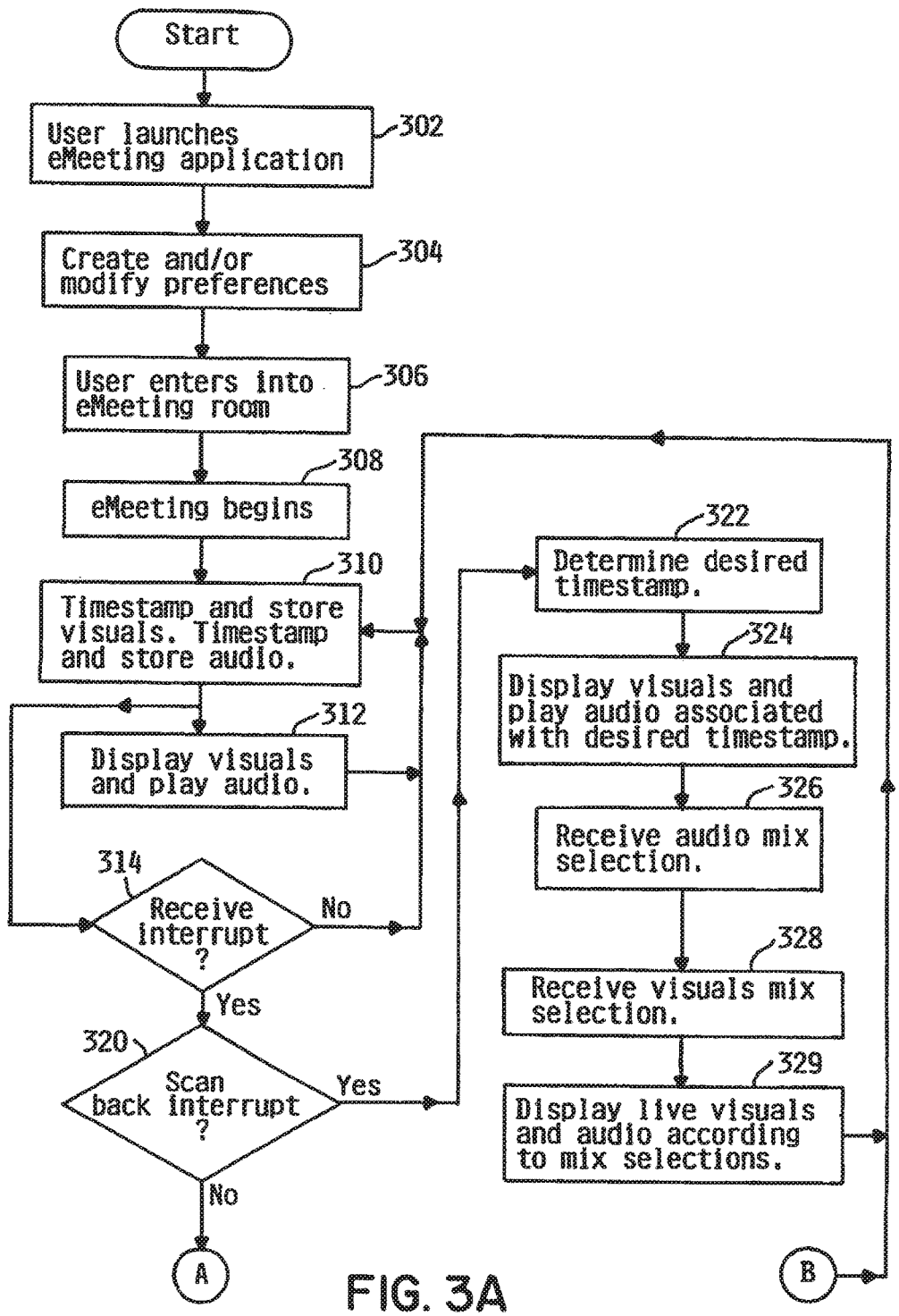
FIGS. 3A-3C (hereafter "FIG. 3") illustrate the operation of the interactive presentation environment in FIG. 1.
Figure 3B:
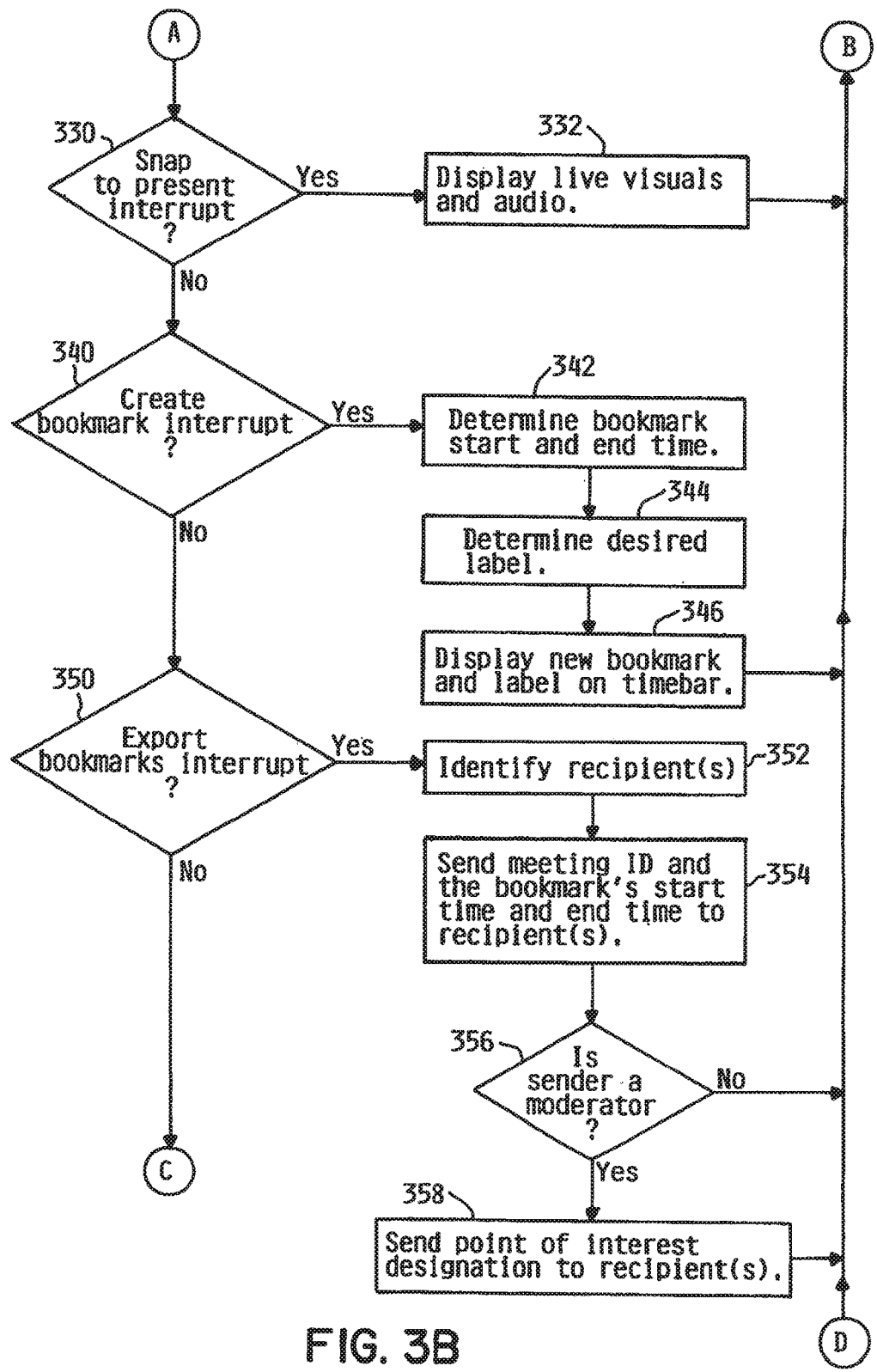
Figure 3C:
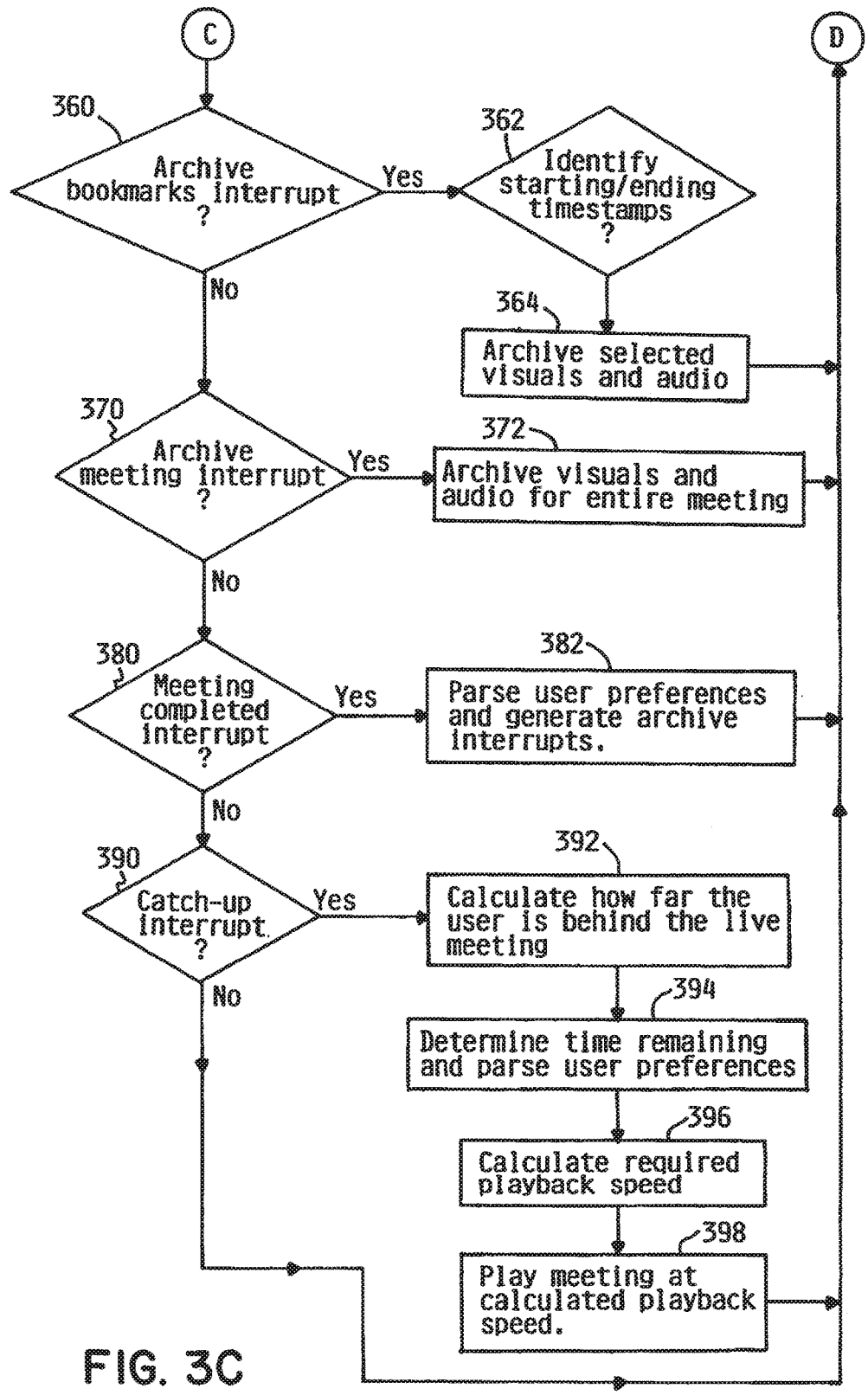

More specifically, users of the eMeeting recorder 150 embodiment in FIGS. 1-3 will see the progress slider 214 on the bottom of the eMeeting GUI 200. To select a recorded portion of the eMeeting for display in the presentation area 204, the user first selects the current position slider 214 and move it move backwards in time (i.e., to the left as depicted in FIG. 2) to the portion the user wants to view/review. Throughout this process, the progress indicator 216 continues to move forward in time (i.e., to the right as depicted in FIG. 2), which indicates that the live meeting is continuing and that eMeeting recorder 150 is still recording everything. After the user completes their review of the recorded portions of the meeting, the user can move the current position slider 214 to another location or select the snap to present button 230 to instruct the eMeeting recorder 150 to start displaying the live meeting signal.

In some embodiments, the eMeeting recorder 150 will allow attendees to adjust the volumes of the recorded and live audio signals so that the users can hear both simultaneously, for example by manipulating two slider icons. In these embodiments, the attendee can thus choose to play the recorded audio at 20% volume and the live audio at 80% volume, or may choose to hear only the live audio. In other embodiments, the attendee can choose to play the recorded audio using the left headphone/speaker and the live audio using the right headphone/speaker. Other embodiments may allow the attendee to alter the timing and relative volumes of the portions of each audio signal so that the recorded and live audio signals seem to originate in different locations. Thus, an attendee using one of these embodiments can make the recorded audio seem to originate from one meter in front of them and the live audio seem to originate from five meters behind them.

The eMeeting recorder 150 embodiments in FIGS. 1-4 will also allow users to bookmark a portion of the recorded meeting by selecting a portion of the timeline 206, and then selecting "bookmark" from a context sensitive pop-up menu (not shown) or by clicking the "Bookmark" button 232. The eMeeting recorder 150 will then display a pop-up window (not shown) prompting the user for a label, and then mark the timeline 206 accordingly. Embodiments may further allow users to share these bookmarks by selecting a bookmark 210 and dragging it to another meeting attendee 203 in the participant list 202. The recipient attendee 203 can then add the shared bookmark to their own timeline, view the associated portion of the meeting, and/or exchange instant messages with the sender about the bookmarked portion of the meeting. Some embodiments may further allow one user to be designated as a "moderator." who can then create a common set of bookmarks for the benefit of all attendees.

Users can each archive a portion of the meeting or the entire meeting once the event is complete. Archiving bookmarked portions of the meeting may be particularly desirable as a way to preserve the "best parts" of the meeting for later viewing, without the storage requirements of a full meeting archive. Some embodiments may also prompt the users to save or delete the recording when the meeting is over; or may save one or two meetings, then automatically remove and replace them when the user attends a new eMeeting. Still other embodiments could allow the user to designate a maximum amount of storage to be used for storing eMeetings and/or may allow the user to give any bookmarked slices greater priority for that space.

Some embodiments may also integrate into a user's communications and calendaring software, such Lotus Notes® from International Business Machines, Inc. In these embodiments, users can store the archived eMeeting along with its corresponding calendar entry, which may allow the user to more easily locate and view the best portions of the meeting. This feature may also allow the user to more easily send his identified highlights to the other attendees of the meeting. These embodiments may also provide the option to use the meeting's invitee list as an access control list, and then block access to the highlights by people who were not invited to the original meeting.

Because the visuals of many eMeetings comprise substantially static images, the eMeeting recorder 150 in some embodiments may record audio for these periods of time, together with a static picture until the visual changes. This feature may be desirable because it can substantially decrease the size of the resulting eMeeting archive. That is, these images may store the visuals as a series of pictures, rather than as video, and display these pictures as slides. Because these pictures generally require less storage space than video, the resulting archive would be smaller. In these embodiments, the audio would be recorded on a separate track and then synchronized so that the video track can be truly blank until movement is detected all the while a compressed audio track is recorded.

In some embodiments, the eMeeting recorder 150 may use well-known audio, picture, and/or video compression codecs in place of or in addition to the static image techniques previously described. Suitable codecs include, without limitation, Sorenson, RealAudio, RFC 2326, RFC 3550, RFC 3551, RealVideo, H261, H263, one of the Moving Picture Experts Group ("MPEG") encoding standards, the Joint Photographic Experts Group ("JPEG") encoding, Graphics Interchange Format ("GIF") encoding, DIVX, Vorbis, Windows Media Audio. Windows Media Video, and the like, to reduce the size of the resulting archives.

FIG. 3 illustrates the operation of the eMeeting recorder 150 in more detail. At block 302, the user launches and/or powers-on the eMeeting recorder 150. At block 304, the eMeeting recorder 150 prompts the user to establish a profile if this is their first use of the system 150 or inquires whether the user wants to create or modify their profile. This profile can include the user's name, nickname, electronic mail address, eMeeting recording preferences, and eMeeting retention preferences. At block 306, the user selects an eMeeting to attend from a list of available eMeetings, enters the associated virtual meeting room, and waits for the eMeeting to begin. Some embodiments of the present invention may allow the user to initiate and accept ad-hock meetings.

The eMeeting begins at block 308, which causes the eMeeting recorder 150 to begin receiving a visuals signal and an audio signal from the eMeeting server. At block 310, the eMeeting recorder 150 timestamps the visuals and the audio signal, and then stores the visuals and audio on its storage device 140. In some embodiments, block 310 may include compressing the visuals and/or audio signal. At block 312, the eMeeting recorder displays the visuals and plays the audio signals.

While receiving, storing, and presenting the visuals and audio signals, the eMeeting recorder 150 will listen at block 314 for indication of an event, commonly called an interrupt. In response, the eMeeting recorder 150 will perform certain actions, and then return to block 314 to wait for the next interrupt. Blocks 320-398 represent some of the interrupts to which the eMeeting recorder 150 will respond, together with the actions associated with that interrupt.

At blocks 320-322, if the eMeeting recorder 150 received a scan back interrupt, the eMeeting recorder 150 will first identify the portion of the recorded meeting at which to begin. Suitable methods include detecting that the user selected a location along the time bar 206 and detecting that the user selected a bookmark 210. Next, at block 324, the eMeeting recorder 150 will begin to display the past visuals and play the past audio. Also at block 324, the eMeeting recorder 150 will continue to receive and store the live/current visuals and audio signal. At block 326, the eMeeting recorder 150 will prompt the user to indicate whether the user wants to only hear the past audio signal, only hear the live audio signal, hear both audio signals at different volumes, or hear both audio signals from different simulated locations. At block 328, the eMeeting recorder 150 will prompt the user to indicate whether they want to display only the past visuals, only the live visuals, both visuals simultaneously on separate halves of the screen, or both visuals simultaneously in a picture-in-picture format in the display area 204. At block 329, the eMeeting recorder 150 will display the visuals and play the audio signals according to the selections received at blocks 326 and 328.

At blocks 330-332, if the eMeeting recorder 150 receives a snap-to-present interrupt, the eMeeting recorder will stop playing any recorded visuals and/or audio, and begin showing the current visuals and audio. In some embodiments, this snap-to-present interrupt will reset all audio and visuals so that the users full attention can be focused on the live signal. Any interface customizations may be saved, however, for use when the user scans back again. Those skilled in the art will appreciate that the snap-to-present interrupt may be generated in response to the user selecting the snap-to-present button 230.

At blocks 340-342, if the eMeeting recorder 150 received a create bookmark interrupt, the eMeeting recorder 150 will first identify the start and end of the desired bookmark. Suitable methods include detecting that the user selected portion of the time bar 206. The eMeeting recorder will then prompt the user for a bookmark name at block 344. At block 346, the eMeeting recorder 150 will highlight the selected portion of the time bar 206 and label the highlighted portion with the name provided at block 344.

At blocks 350-352, if the eMeeting recorder 150 received an export bookmark interrupt, the eMeeting recorder 150 will first identify the recipient(s) to whom the bookmark should be sent. Suitable methods include detecting that the user dragged the bookmark icon to another participant in the participant list 202 or selected the another participant's email address from a pop-up menu (not shown). At block 354, the eMeeting recorder 150 sends a meeting identifier and the bookmark's start time and end time to the recipient(s). At block 356, detects whether the sending user is a designated a "Moderator" of the eMeeting. If the sender is a moderator, the eMeeting recorder 150 further sends an indication that the bookmark is officially designated a point of interest at block 358.

At blocks 360-362, if the eMeeting recorder 150 received an archive bookmarks interrupt, the eMeeting recorder 150 will first identify the start timestamp and end timestamp of every bookmarked section in the eMeeting. The eMeeting recorder 150 will then archive the audio and visuals associated with the bookmarked sections, together with their timestamps at block 364. At blocks 370-372, if the eMeeting recorder 150 received an archive meeting interrupt, the eMeeting recorder 150 will create an archive containing the visuals and audio signal for the entire meeting. The eMeeting recorder 150 may store the archive using the audio/visual format in which it received the audio and visuals, or may use a format suitable for replay on a standard audio-visual player, such as a software media player or a DVD player. In some embodiments, the archive will also include any bookmarks. In either case, users can open the archive, scan the visuals, and listen to the audio signals at a later time. Those skilled in the art will appreciate that storing the timestamps with partial archives may be desirable because it will allow future users to know they are watching a partial view of the meeting and to allow them to estimate how much of the meeting the archive contains.

At blocks 380-382, if the eMeeting recorder 150 received a meeting completed interrupt, the eMeeting recorder 150 will first check the user's preferences, if any. Based on these preferences, the eMeeting recorder 150 will then automatically archive the bookmarked sections, automatically archive the entire meeting, automatically delete the entire meeting, or prompt the user about whether it should archive or delete the meeting. In some embodiments, these preferences may vary depending on whether the user is a moderator or an ordinary participant.

At blocks 390-392, if the eMeeting recorder 150 received a catch-up interrupt, the eMeeting recorder 150 first determines how far the user is behind live meeting (e.g., the user is currently watching events that occurred 2 minutes ago in the live meeting). At block 394, the eMeeting recorder 150 then determines how much time is left in the meeting and/or checks the user's preferences for a catch up time. The eMeeting recorder then calculates at block 396 at what speed it must play the remaining portions of the eMeeting so that the user finishes the eMeeting at the same time as the other participants and/or so that the user catches up with the live presentation at the end of the catch up time. At block 398, the eMeeting recorder 150 begins playing the recorded signal at the calculated rate beginning where the user stopped watching the live meeting. Some embodiments may further increase the playback speed of pauses in the audio track. These embodiments may be desirable because the user could catch-up more quickly without experiencing the distortion associated with faster playback speeds.

Alternative system architectures are also within the scope of the present invention. For example, the eMeeting recording and storage functions could reside on the server rather than on the client machines. These embodiments could then record and save multiple archive versions for each attendee, or could store a single master version against which each attendee could select/identify portions for archiving. In the later case, the server-side eMeeting recorder 150 would archive the streams when any of the users indicates that the section should be preserved. This master version could be saved permanently on the server or could be duplicated onto the client computer after the meeting.

Figure 4A:
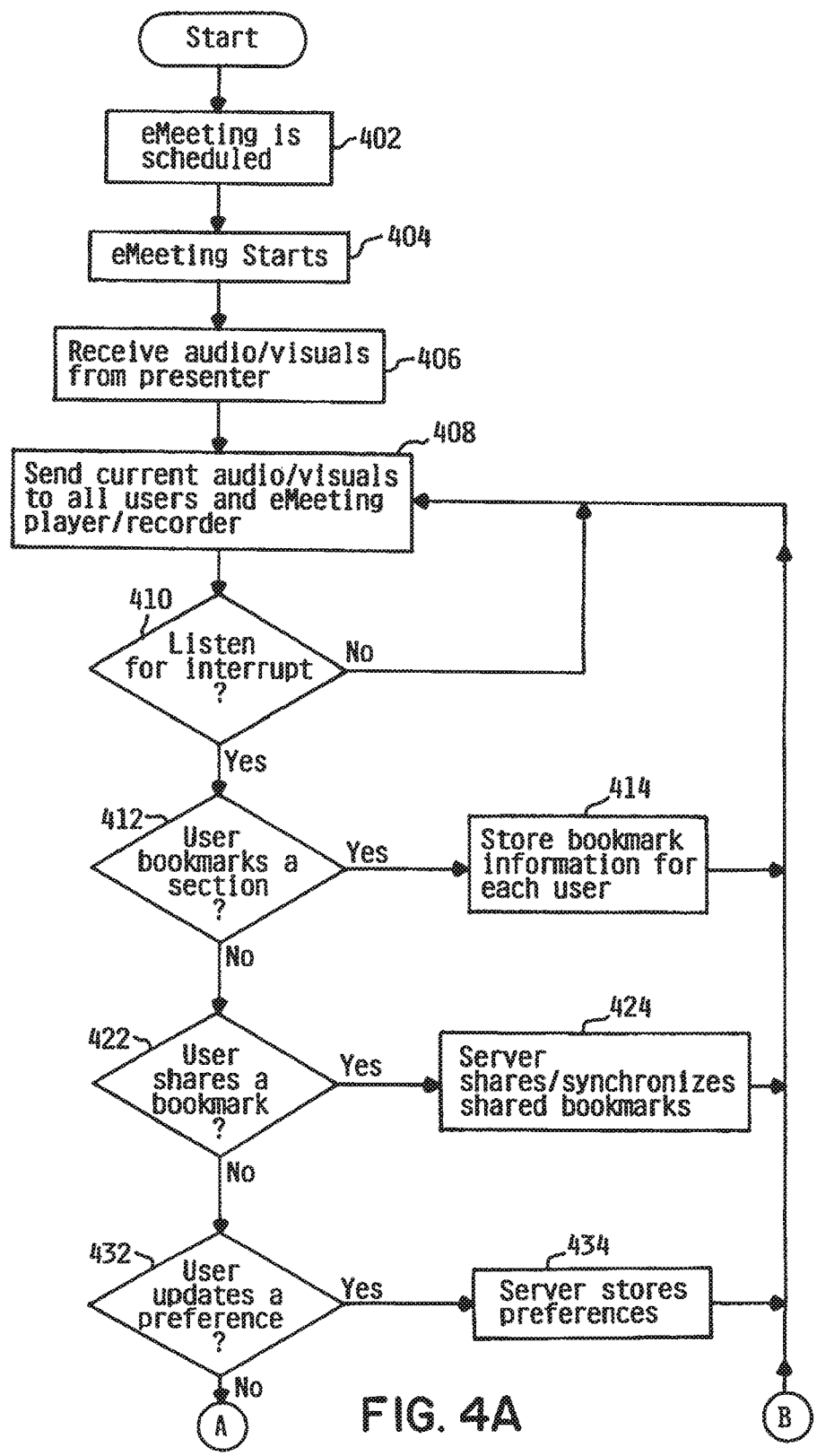
FIGS. 4A-4C (hereafter "FIG. 4") illustrate the operation of a second interactive presentation environment embodiment.
Figure 4B:
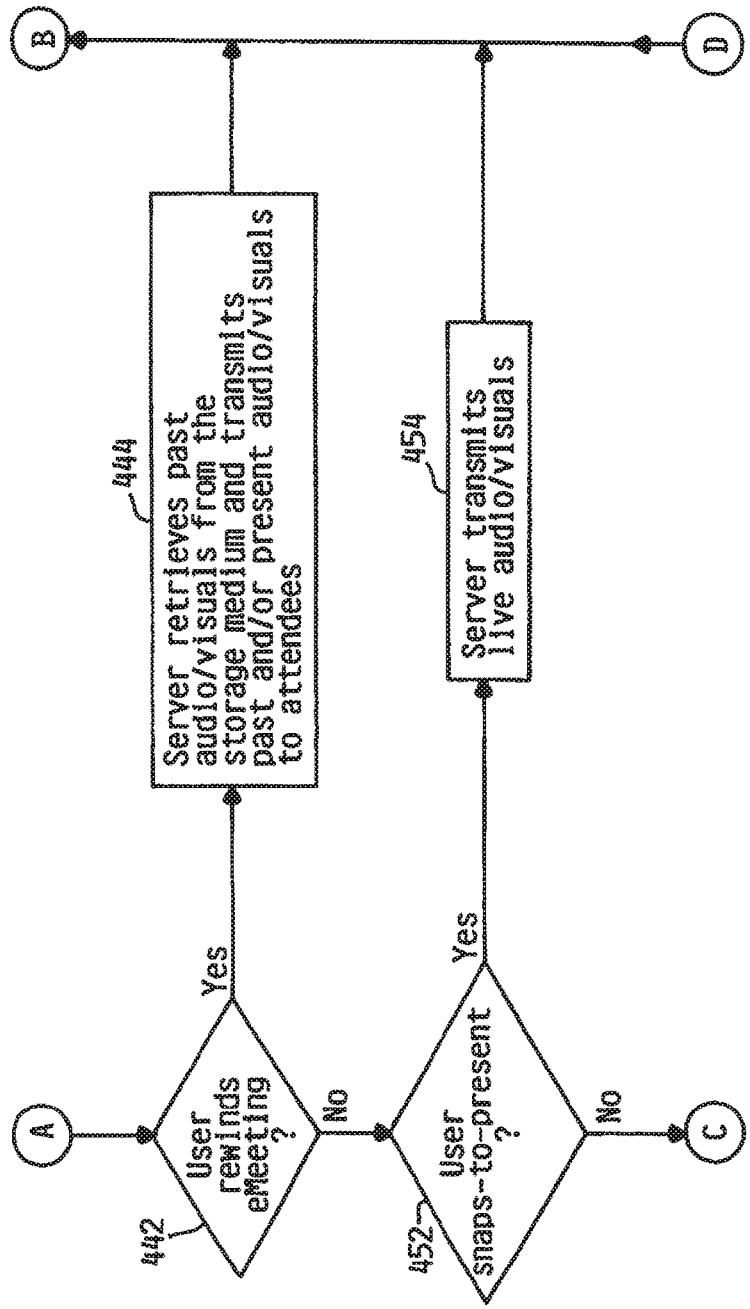
Figure 4C:
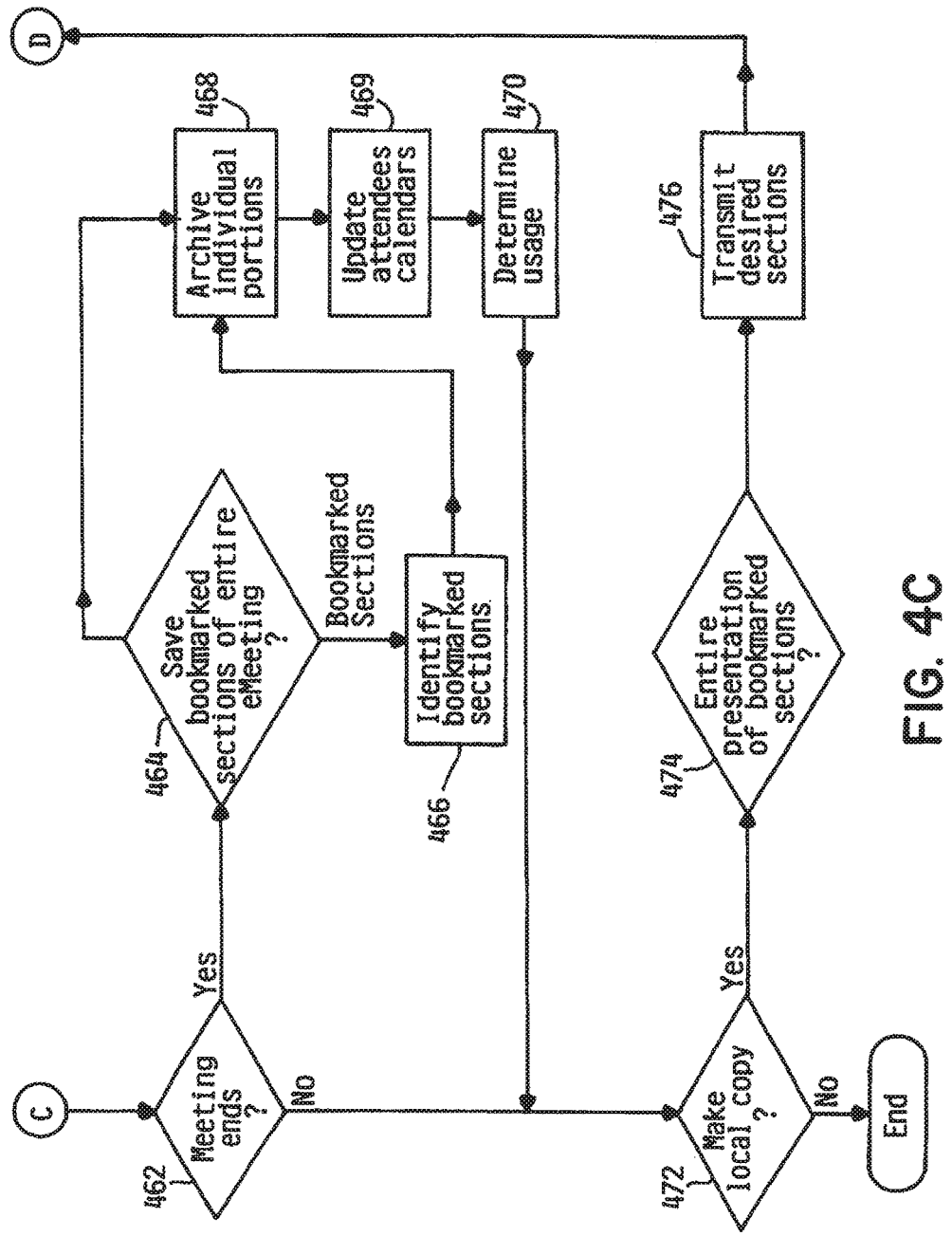

FIG. 4 illustrates the operation of an eMeeting server embodiment in more detail. At block 402, the eMeeting application server program 126 receives a request to schedule an eMeeting and reserves the necessary system resources. At block 404, each attendees' eMeeting recorder 150 connects to eMeeting application server program 126. Next, at blocks 406-508, the eMeeting application server program 126 begins to receive an audio/visuals stream from the designated presenter and sending that audio/visual stream to the other attendees. While receiving and sending visuals/audio signals, eMeeting application server program 126 will also listen at block 410 for interrupts. In response to receiving an interrupt, the server computer 102a will perform certain actions, and then return to blocks 406-410.

At block 412, eMeeting application server program 126 receives a bookmark selection interrupt from an attendee's eMeeting recorder 150. In response, the eMeeting application server program 126 creates a start or stop bookmark at block 414 and associates the bookmark with the attendee that caused the interrupt.

At block 422, the eMeeting application server program 126 receives a share bookmark interrupt from an attendee's eMeeting recorder 150. In response, the eMeeting application server program 126 associates the bookmark with every attendee of the eMeeting at block 424. Also at block 424, the eMeeting application server program 126 sends the new bookmarks to each users' eMeeting recorder 150 or to selected users' eMeeting recorder 150 (i.e., not to the whole group).

At block 432, the eMeeting application server program 126 receives an update preferences interrupt. In response, the eMeeting application server program 126 stores the updated preferences at block 434.

At block 442, the eMeeting application server program 126 receives an interrupt associated with a request from an attendee to rewind the meeting and view the recorded signal. In response, at block 444, the eMeeting application server program 126 retrieves past audio and visuals and transmits the requested past audio and visuals to the requesting attendee. In some embodiments, the eMeeting application server program 126 may simultaneously transmit both the past and present audio/visuals along with preferences indicating audio spatial separation or visual picture in picture and displays to user.

At block 452, the eMeeting application server program 126 receives a snap to present interrupt. In response, the eMeeting application server program 126 begins sending the live audio/visuals to requesting attendee at block 454.

At block 462, the eMeeting application server program 126 receives an end of meeting interrupt. The eMeeting application server program 126 responds as block 464 by prompting the moderator whether it should just archive the bookmarked sections or whether it should archive the whole eMeeting. If the moderator indicates that only the bookmarked sections should be archived, the eMeeting application server program 126 proceeds at block 466 to identify those portions of the recorded audio/visuals that have been bookmarked by any user. The eMeeting application server program 126 then archives the appropriate portions of the audio/visuals on an storage medium at block 468. At block 469, the eMeeting application server program 126 may store a reference to the saved eMeeting saved portions in the attendees' calendar entries and/or team databases. At block 470, the eMeeting application server program 126 determines how much of the service each attended used and records the information accordingly.

At block 472, the eMeeting application server program 126 receives a make local copy interrupt. This may occur in response to a prompt immediately after the eMeeting or at a later time. At block 474, the eMeeting application server program 126 prompts the user to determine whether that user wants a copy of the entire meeting (if available) or just their bookmarked sections. At block 476, the eMeeting application server program 126 prepares a file containing the desired sections and transmits them to the end user. This feature may be desirable because the user can view the eMeeting on a device with limited storage, such as a mobile device, and store the local copy on a different device.

Referring again to FIG. 1, the computer systems 102 in this embodiment are general-purpose programmable computing devices. Accordingly, the central processing units 110 may be any device capable of executing the program instructions stored in main memory 112, and may be constructed from one or more microprocessors and/or integrated circuits. In this embodiment, when one of the computer systems 102 start up, the associated CPU 110 initially executes the program instructions that make up the operating system 124, which manages the physical and logical resources of the computer system 102. These resources include the central processing unit 110, the main memory 112, the mass storage interface 114, the display interface 116, the network interface 118, and the system bus 122. Moreover, although each computer system 102 in FIG. 1 is shown to with only a single processing unit 110 and a single system bus 122, those skilled in the art will appreciate that the present invention may be practiced using a computer system 102 that has multiple processing units 110 and/or multiple system buses 122. Moreover, the interfaces 114, 116, 118, and 120 may each include their own separate, fully programmed microprocessors and may be used to off-load compute-intensive processing from the main processing units 110.

The computing systems 102a of the present invention can collect and store their visuals and audio signals using analog or digital means, or a combination of both. The network interfaces 116, accordingly, can be any device that facilitates such communication, regardless of whether the network connection is made using present-day analog and/or digital techniques or via some networking mechanism of the future. Suitable communication mediums 106 include, but are not limited to, the Internet; intranets; cellular transmission networks; wireless networks implemented one of the IEEE 802.11 Ix, IEEE 802.16. General Packet Radio Service ("GPRS"), or Bluetooth specifications; and the like. Other embodiments may use Ultra Wide Band ("UWB") technology, such as that described in FCC 02-48, which is herein incorporated by reference in its entirety. Those skilled in the art will appreciate that many different network protocols can be used to implement the communication medium 106. The Transmission Control Protocol/Internet Protocol ("TCP/IP") is an example of a suitable network protocol for Internet-based communication.

The embodiments described with reference to FIGS. 1-4 generally use a client-server network architecture. These embodiments are desirable because the clients 102b can utilize the services of the web server computers 102a without either computer system 102 requiring knowledge of the working details about the other. However, those skilled in the art will appreciate that other network architectures are within the scope of the present invention. Examples of other suitable network architectures include peer-to-peer architectures, grid architectures, and multi-tier architectures. Accordingly, the terms web server and client computer should not be construed to limit the invention to client-server network architectures.

The main memory 112 and the storage device 140 work cooperatively in this to store the visuals and the audio signals. Accordingly, the main memory 112 and the storage devices 140, 142 may be any system capable of storing and retrieving data for the central processing units 110. These systems may utilize virtual addressing mechanisms that allow the computer systems 102 to behave as if they only have access to a large, single storage entity instead of access to multiple, smaller storage entities such as the main memory 112 and the DASD device 140. Therefore, while the operating systems 124, the application servers 128, and the databases 126 are shown to reside in main memory 112, those skilled in the art will recognize that these items are not necessarily all completely contained in main memory 112 at the same time, and may even reside in the virtual memory of other computer systems coupled to the computer system 102. In addition, the storage devices 140 in some embodiments may include archival storage media, such as hard disk drives, tape (e.g., mini-DV), writeable compact disks (e.g., CD-R and CD-RW), digital versatile disks (e.g., DVD, DVD-R, DVD+R, DVD+RW, DVD-RAM), holography storage systems, blue laser disks. IBM Millipede devices and the like.

The display interface 116 is used to directly connect one or more display units 180 to the computer system 102. These display units 180 may be non-intelligent (i.e., dumb) terminals, such as a cathode ray tube, or may themselves be fully programmable workstations used to allow IT administrators and users to communicate with one or more of the computer systems 102. Note, however, that while the display interface 116 is provided to support communication with one or more displays 180, the computer systems 102 does not necessarily require a display 180 because all needed interaction with users and other processes may occur via network interface 118.

One suitable server computer 102a is an eServer iSeries computer running the i5/OS multitasking operating system, both of which are produced by International Business Machines Corporation of Armonk. N.Y. One client computer 102b is an IBM ThinkPad running the Linux or Windows operating systems, also available from International Business Machines Corporation. However, those skilled in the art will appreciate that the mechanisms and apparatus of the present invention apply equally to any computer system 102 and operating system 124, regardless of whether one or both of the computer 102 are complicated multi-user computing apparatuses, a single workstations, lap-top computers, mobile telephones, personal digital assistants ("PDAs"), video game systems, or the like.

Although the present invention has been described in detail with reference to certain examples thereof, it may be also embodied in other specific forms without departing from the essential spirit or attributes thereof. For example, those skilled in the art will appreciate that the present invention is capable of being distributed as a program product in a variety of forms, and applies equally regardless of the particular type of signal bearing media used to actually carry out the distribution. Examples of suitable signal bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive, a CD-R disk, a CD-RW disk, or hard-disk drive); or (iii) information conveyed to a computer by a communications medium, such as through a computer or telephone network, including wireless communications, and specifically includes information downloaded from the Internet and other networks. Such signal-bearing media, when carrying computer-readable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software and web services that implement, some or all of the methods described herein. Aspects of these embodiments may also include analyzing the client's operations, creating recommendations responsive to the analysis, generating software to implement portions of the recommendations, integrating the software into existing processes and infrastructure, metering use of the systems, allocating expenses to users of the systems, and billing for use of the systems. In some embodiments, the metering and billing may include charges may be related to the length of the eMeeting, how many clients attend the meeting, the quality of the audio/visual signals, the use of server-side services, or some combination thereof. The cost of the eMeeting can then be charged to the presenter or to each attendee.

In addition, although the eMeeting recorder 150 has been described as presentation software executing on a general purpose computing system 102, the present invention may also be embodied as a special purpose electronic device and/or other classes of software, such as interactive demo software, video conference software, and the like.

The present invention provides numerous advantages over conventional eMeeting clients, such as (i) the ability to rewind a current eMeeting to see previous slides/views/live demos while meeting is still going on; (ii) to "snap to present" to see client view; (iii) bookmark favorite time slices for repeated viewing; (iv) to share bookmarked time slices through private chats. Thus, for example, when a meeting occurring, the user may ask co-participant "what is the presenter really talking about?" The co-participant can then drag a bookmarked time slice onto the chat window, which would allow the first participant to jump to and view that bookmarked time slice; to allow the moderator/presenter to add "points of interest" that would highlight areas in the meeting that could be of interest. These points of interest appear as optional bookmarks to all viewers and would show up on their screen; (vi) to archive all of a presentation for later viewing; (vii) to archive the "best parts" of a meeting for later viewing; (viii) to control the visual aspects while keeping the audio aspects in real-time; and (ix) organize any questions into groups.

The accompanying figures and this description depicted and described embodiments of the present invention, and features and components thereof. Those skilled in the art will appreciate that any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Therefore, it is desired that the embodiments described herein be considered in all respects as illustrative, not restrictive, and that reference be made to the appended claims for determining the scope of the invention.

What is claimed is:

1. A non-transitory computer-readable medium comprising instructions stored thereon that, when executed by a computing device, cause the computing device to:
provide, a real time presentation of a live meeting by the computing device, wherein the live meeting is a recorded live meeting and the real time presentation of the live meeting includes audio and visual components presented to multiple participants;
provide a first control for generating bookmarked portions of the recorded live meeting during the real time presentation of the live meeting;
provide, in response to receiving a selection of the first control to generate a first bookmark, a representation of the first bookmarked portion of the recorded live meeting to display the first bookmarked portion during the real time presentation of the recorded live meeting;
provide a second control for adjusting at least one audio parameter to impart audio source location effects for at least one of: audio of select bookmarked portions or audio of a currently-presented portion of the real time presentation, and
provide, during the real time presentation of the live meeting, first audio of the first bookmarked portion and second audio of the currently-presented portion, wherein at least one of the first audio or the second audio includes a first audio parameter to impart an audio source location effect according to a selection using the second control.

2. The non-transitory computer-readable medium of claim 1, wherein the instructions, when executed, further cause the computing device to:
receive a second indication that the representation of the first bookmarked portion of the recorded live meeting was selected by a first participant of the multiple participants during the real time presentation of the live meeting; and
responsive to receiving the second indication, simultaneously provide the first bookmarked portion and a currently-presented portion of the live meeting to the first participant during the real time presentation of the live meeting.

3. The non-transitory computer-readable medium of claim 2, wherein the first audio parameter includes relative volumes of at least one of the first bookmarked portion or the currently-presented portion.

4. The non-transitory computer-readable medium of claim 1, wherein the instructions further cause the computer to:
provide a graphical timeline for the recorded live meeting;
receive a selection of a beginning point on the graphical timeline representing a beginning of the first bookmarked portion and an ending point on the graphical timeline representing an ending of the first bookmarked portion; and
generate the first bookmarked portion of the recorded live meeting including the beginning of the first bookmarked portion and the ending of the first bookmarked portion.

5. The non-transitory computer-readable medium of claim 4, wherein the instructions further cause the computer to display the representation of the first bookmarked portion of the recorded live meeting on the graphical timeline.

6. The non-transitory computer-readable medium of claim 1, wherein the instructions further cause the computer to:
receive an indication that a first participant shared the first bookmarked portion of the recorded live meeting with a second participant; and
provide the shared first bookmarked portion to the second participant by an electronic message.

7. The non-transitory computer-readable medium of claim 1, wherein the instructions further cause the computer to:
prompt, in response to a termination of the live meeting, one or more of the multiple participants to save or delete the first bookmarked portion of the recorded live meeting;
receive a confirmation to save or delete the first bookmarked portion; and
save the first bookmarked portion to an archive location, or delete the first bookmarked portion, according to the confirmation.

8. The non-transitory computer-readable medium of claim 1, wherein the instructions further cause the computer to:
receive a confirmation to save the first bookmarked portion;
identify one or more static video images within the first bookmarked portion;
decrease a size of the first bookmarked portion by replacing the identified one or more static video images with one or more corresponding static slide pictures; and
save, to an archive location, the first bookmarked portion of the decreased size.

9. The non-transitory computer-readable medium of claim 1, wherein the instructions further cause the computer to:
receive a confirmation to save the first bookmarked portion;
identify a calendar entry associated with the live meeting, the calendar entry being associated with a calendaring software application; and
save, to an archive location, the first bookmarked portion and the identified calendar entry.

10. A system, comprising:
one or more processors; and
a memory having instructions stored thereon that, when executed by the one or more processors, cause a computing device to perform operations comprising:
providing a real time presentation of a live meeting by the one or more processors, wherein the live meeting is a recorded live meeting and the real time presentation of the live meeting includes audio and visual components presented to multiple participants;
providing a first control for generating bookmarked portions of the recorded live meeting during the real time presentation of the live meeting;
providing, in response to receiving a selection of the first control to generate a first bookmark, a representation of the first bookmarked portion of the recorded live meeting to display the first bookmarked portion during the real time presentation of the recorded live meeting;

provide a second control for adjusting at least one audio parameter to impart audio source location effects for at least one of: audio of select bookmarked portions or audio of a currently-presented portion of the real time presentation; and provide, during the real time presentation of the live meeting, first audio of the first bookmarked portion and second audio of the currently-presented portion, wherein at least one of the first audio or the second audio includes a first audio parameter to impart an audio source location effect according to a selection using the second control.

11. The system of claim 10, wherein the operations further comprise:

providing a graphical timeline for the recorded live meeting;

receiving a selection of a beginning point on the graphical timeline representing a beginning of the first bookmarked portion and an ending point on the graphical timeline representing an ending of the first bookmarked portion; and generate the first bookmarked portion of the recorded live meeting including the beginning of the first bookmarked portion and the ending of the first bookmarked portion, wherein the representation of the bookmarked portion of the recorded live meeting is displayed on the graphical timeline.

12. The system of claim 11, wherein the operations further comprise:

receiving an indication that a first participant shared the first bookmarked portion of the recorded live meeting with a second participant;

providing the representation of the shared first bookmarked portion to the second participant;

receiving an indication that the first bookmarked portion was selected by the second participant during the real time presentation of the live meeting; and responsive to receiving the indication that the first bookmarked portion was selected, providing the first bookmarked portion simultaneous with providing a currently-presented portion of the live meeting to the second participant during the real time presentation of the live meeting.

13. The system of claim 10, wherein the operations further comprise:

prompting, in response to a termination of the live meeting, one or more of the multiple participants to save or delete the first bookmarked portion of the recorded live meeting;

receiving a confirmation to save or delete the first bookmarked portion; and saving the first bookmarked portion to an archive location, or deleting the first bookmarked portion, according to the confirmation.

14. The system of claim 10, wherein the operations further comprise:

receiving a confirmation to save the first bookmarked portion;

identifying one or more static video images within the bookmarked portion;

decreasing a size of the first bookmarked portion by replacing the identified one or more static video images with one or more corresponding static slide pictures; and saving, to an archive location, the first bookmarked portion of the decreased size.

15. The system of claim 10, wherein the operations further comprise:

receiving a confirmation to save the first bookmarked portion;

identifying a calendar entry associated with the live meeting, the calendar entry being associated with a calendaring software application; and saving, to an archive location, the first bookmarked portion together with the identified calendar entry.

16. A method, comprising:

providing a real time presentation of a live meeting between multiple participants, wherein the live meeting is a recorded live meeting and real time presentation of the live meeting includes audio and visual components presented to the multiple participants;

providing a first control for generating bookmarked portions of the recorded live meeting during the real time presentation of the live meeting;

providing, in response to receiving a selection of the first control to generate a first bookmark, a representation of the first bookmarked portion of the recorded live meeting to a first participant of the multiple participants during the real time presentation of the recorded live meeting;

simultaneously providing, in response to receiving an indication that the representation was selected by the first participant during the real time presentation of the live meeting, the first bookmarked portion and a currently-presented portion of the live meeting to the first participant during the real time presentation of the live meeting;

provide a second control for adjusting at least one audio parameter to impart audio source location effects for at least one of: audio of select bookmarked portions or audio of a currently-presented portion of the real time presentation; and provide, during the real time presentation of the live meeting, first audio of the first bookmarked portion and second audio of the currently-presented portion, wherein at least one of the first audio or the second audio includes a first audio parameter to impart an audio source location effect according to a selection using the second control.

17. The method of claim 16, further comprising:

providing a user interface for display of the real time presentation of the live meeting, the user interface comprising a listing of the multiple participants and a graphical timeline for the recorded live meeting, wherein the representation of the first bookmarked portion of the recorded live meeting is displayed on a graphical timeline, and wherein the user interface is configured to provide sharing of the first bookmarked portion between the multiple participants by way of a dragging operation that drags the representation from the graphical timeline to a selected participant in the listing of the multiple participants;

receiving an indication that the first bookmarked portion of the recorded live meeting was shared by the first participant with a second participant by way of the dragging operation; and providing the representation of the shared first bookmarked portion to the selected participant.

18. The method of claim 16, further comprising:
prompting, in response to a termination of the live meeting, the first participant to save the first bookmarked portion of the recorded live meeting;
receiving a confirmation to save the first bookmarked portion;
identifying one or more static video images within the first bookmarked portion;
decreasing a size of the first bookmarked portion by replacing the identified one or more static video images with one or more corresponding static slide pictures; and
saving, to an archive location, the first bookmarked portion of the decreased size.

19. The method of claim 16, further comprising:
prompting, in response to a termination of the live meeting, the first participant to save the first bookmarked portion of the recorded live meeting;
receiving a confirmation to save the first bookmarked portion;
identifying a calendar entry associated with the live meeting, the calendar entry being associated with a calendaring software application; and
saving, to an archive location, the first bookmarked portion together with the identified calendar entry.

* * * * *